US008139108B2

(12) United States Patent  
Stratton et al.

(10) Patent No.: US 8,139,108 B2
(45) Date of Patent: Mar. 20, 2012

(54) SIMULATION SYSTEM IMPLEMENTING REAL-TIME MACHINE DATA

(75) Inventors: Kenneth L. Stratton, Dunlap, IL (US); Jamie Shults, Peoria, IL (US); Jean-Jacques Clar, Dunlap, IL (US); Derrick Darby, Dunwoody, GA (US); Augusto J. Opdenbosch, Roswell, GA (US); Juan Carlos Santamaria, Suwanee, GA (US)

(73) Assignee: Caterpillar Inc., Peoria, IL (US)

( * ) Notice: Subject to any disclaimer, the term of this patent is extended or adjusted under 35 U.S.C. 154(b) by 1450 days.

(21) Appl. No.: 11/700,015

(22) Filed: Jan. 31, 2007

(65) Prior Publication Data

US 2008/0180523 A1  Jul. 31, 2008

(51) Int. Cl.  
 *H04N 7/00* (2006.01)  
 *H04N 7/18* (2006.01)  
 *G06F 7/00* (2006.01)
(52) U.S. Cl. .............................. 348/114; 348/121; 701/2
(58) Field of Classification Search ........................ None  
 See application file for complete search history.

(56) References Cited

U.S. PATENT DOCUMENTS

| 4,831,539 | A |   | 5/1989 | Hagenbuch |
| 4,855,822 | A |   | 8/1989 | Narendra et al. |
| 5,412,569 | A |   | 5/1995 | Corby, Jr. et al. |
| 5,706,195 | A |   | 1/1998 | Corby, Jr. et al. |
| 5,904,724 | A | * | 5/1999 | Margolin ...................... 701/120 |
| 5,923,270 | A | * | 7/1999 | Sampo et al. ................. 340/988 |
| 6,094,625 | A |   | 7/2000 | Ralston |
| 6,510,381 | B2 |  | 1/2003 | Grounds et al. |
| 6,633,800 | B1 |  | 10/2003 | Ward et al. |
| 6,739,078 | B2 | * | 5/2004 | Morley et al. .................. 37/348 |
| 7,099,752 | B1 | * | 8/2006 | Lenell et al. ...................... 701/2 |
| 7,734,397 | B2 | * | 6/2010 | Peterson et al. ................ 701/50 |
| 7,778,744 | B2 | * | 8/2010 | Rath et al. ........................ 701/3 |
| 2005/0119801 | A1 |  | 6/2005 | Florentin et al. |
| 2005/0148388 | A1 |  | 7/2005 | Varyn et al. |
| 2006/0089757 | A1 |  | 4/2006 | Yoshimura et al. |
| 2006/0224280 | A1 |  | 10/2006 | Flanigan et al. |
| 2009/0177337 | A1 |  | 7/2009 | Yuet et al. |

FOREIGN PATENT DOCUMENTS

| EP | 0674975 | 10/1995 |
| EP | 0 976 879 A1 | 2/2000 |

* cited by examiner

*Primary Examiner* — John B. Walsh  
(74) *Attorney, Agent, or Firm* — Finnegan, Henderson, Farabow, Garrett & Dunner LLP

(57) ABSTRACT

A simulation and control system for a machine is disclosed. The simulation and control system may have a user interface configured to display a simulated environment. The machine simulation and control system may also have a controller in communication with the user interface and a remotely located machine. The controller may be configured to receive from the machine real-time information related to operation of the machine at a worksite. The controller may also be configured to simulate the worksite, operation of the machine, and movement of a machine tool based on the received information. The controller may further be configured to provide to the user interface the simulated worksite, operation, and movement in the simulated environment.

37 Claims, 4 Drawing Sheets

SIMULATION SYSTEM IMPLEMENTING REAL-TIME MACHINE DATA

TECHNICAL FIELD

This disclosure relates generally to a simulation system and, more particularly, to a system that uses real-time performance data to remotely simulate operation of a machine at a worksite.

BACKGROUND

Machines such as, for example, excavators, loaders, dozers, motor graders, haul trucks, and other types of heavy equipment are used to perform a variety of tasks. During the performance of these tasks, the machines may operate in situations that are hazardous to an operator, under extreme environmental conditions uncomfortable for the operator, or at work locations remote from civilization. Because of these factors, the completion of some tasks by an onboard operator can be dangerous, expensive, labor intensive, time consuming, and inefficient.

One solution to this problem may include remotely controlling the machines. Specifically, an offboard operator located remotely from the machine, if provided with a visual representation of the machine and the work environment, could control operation of the machine from a more suitable location. This strategy has been implemented in the past and generally included providing the visual representation of the machine and work environment by way of live video feed broadcast from the worksite to the operator. The operator then was able to provide, via a graphical user interface, operational instructions that were subsequently sent to the machine for control thereof.

Although this strategy of remotely controlling the machines may have been successful in some situations, its use was limited and costly. Specifically, the visual representation of the machine and environment was typically limited to the number of cameras mounted to the machine and the view angles provided by those cameras. To improve visibility or provide different view angles, additional cameras had to be installed on the machine. Because the number of cameras on the machine relates directly to cost and, because the harsh environment of the worksite reduced the component life of the cameras, the initial and operating costs of the system were significant. In addition, wireless video feed in real-time requires large bandwidth, thereby further increasing the operating cost of the system.

An attempt at addressing the problems of high system cost and large bandwidth is described in U.S. Pat. No. 6,739,078 (the '078 patent) issued to Morley et al. on May 25, 2004. Specifically, the '078 patent describes a system utilized to remotely control construction equipment such as a backhoe at an isolated location via a data network, in which a user provides movement instructions via a graphical user interface (GUI) at a user PC. The GUI displays a side view and a top view visual representation of the movable elements of the backhoe (e.g., a boom, a stick, and a bucket). The visual representation is generated in response to movements of the boom, stick, and bucket of the backhoe, which are measured onboard the backhoe and transmitted to the user PC via radio frequencies. In this manner, an operator may remotely control hydraulic actuators onboard the backhoe to move the boom, stick, and bucket and, at the same time, view the resulting motions at a distant location in a cost effective manner.

Although the system of the '078 patent may provide a lower cost, more robust way to remotely view and control motions of construction equipment, its use may still be limited. In particular, because the system of the '078 patent provides a visual representation of only the boom, stick, and bucket, the operator may be unable to properly control engagement of the backhoe with its surrounding environment. In particular, without a representation of the worksite or an excavation surface at the work site, it may be very difficult, if not impossible, to adequately engage the bucket with the excavation surface. In addition, with the minimal visual representation described above, the operator may be unable to remotely move or orient the backhoe itself, or perform other necessary machine tasks.

The system of the present disclosure is directed towards overcoming one or more of the problems as set forth above.

SUMMARY OF THE INVENTION

In accordance with one aspect, the present disclosure is directed toward a machine simulation and control system. The machine simulation and control system may include a user interface configured to display a simulated environment. The machine simulation and control system may also include a controller in communication with the user interface and a remotely located machine. The controller may be configured to receive from the machine real-time information related to operation of the machine at a worksite. The controller may also be configured to simulate the worksite, operation of the machine, and movement of a machine tool based on the received information. The controller may further be configured to provide to the user interface the simulated worksite, operation, and movement in the simulated environment.

According to another aspect, the present disclosure is directed toward a method of remotely controlling a machine. The method may include monitoring machine operation and simulating in real-time a worksite, machine movement within the worksite, and machine tool movement within the worksite based on the monitored machine operation. The method may further include receiving machine control instructions at a location remote from the machine, and affecting operation of the machine in response to the received instructions.

DETAILED DESCRIPTION

Figure 1:
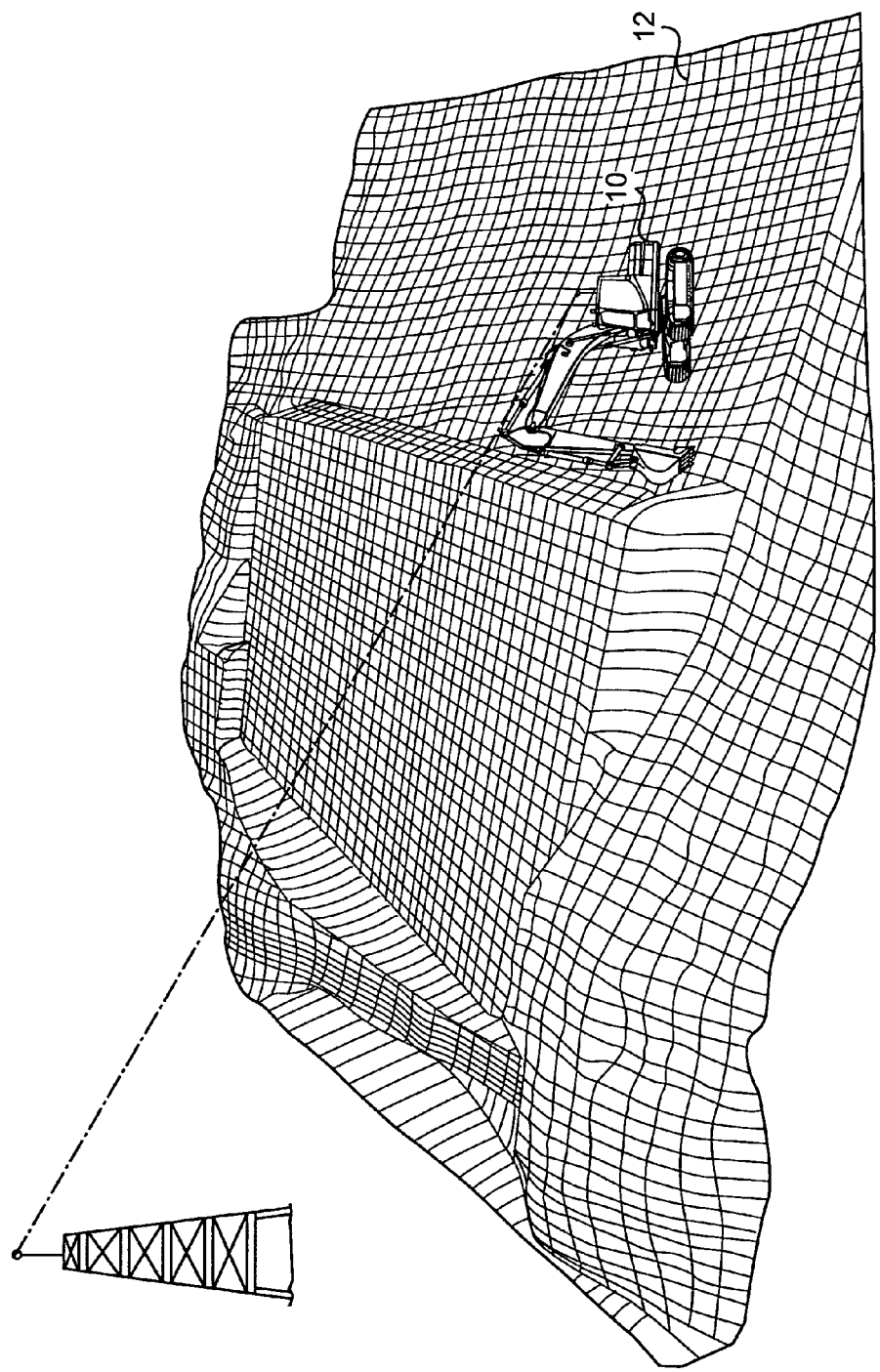
FIG. 1 is a pictorial illustration of an exemplary disclosed machine traveling about a worksite.

FIG. 1 illustrates an exemplary machine 10 performing a predetermined function at a worksite 12. Machine 10 may embody a stationary or mobile machine, with the predetermined function being associated with a particular industry such as mining, construction, farming, transportation, power generation, or any other industry known in the art. For example, machine 10 may be an earth moving machine such as the excavator depicted in FIG. 1, in which the predetermined function includes the removal of earthen material from worksite 12 that alters the geography of worksite 12 to an architecturally desired form. Machine 10 may alternatively embody a different earth moving machine such as a motor grader or a wheel loader, or a non-earth moving machine such as a passenger vehicle, a stationary generator set, or a pumping mechanism. Machine 10 may embody any suitable operation-performing machine.

Figure 2:
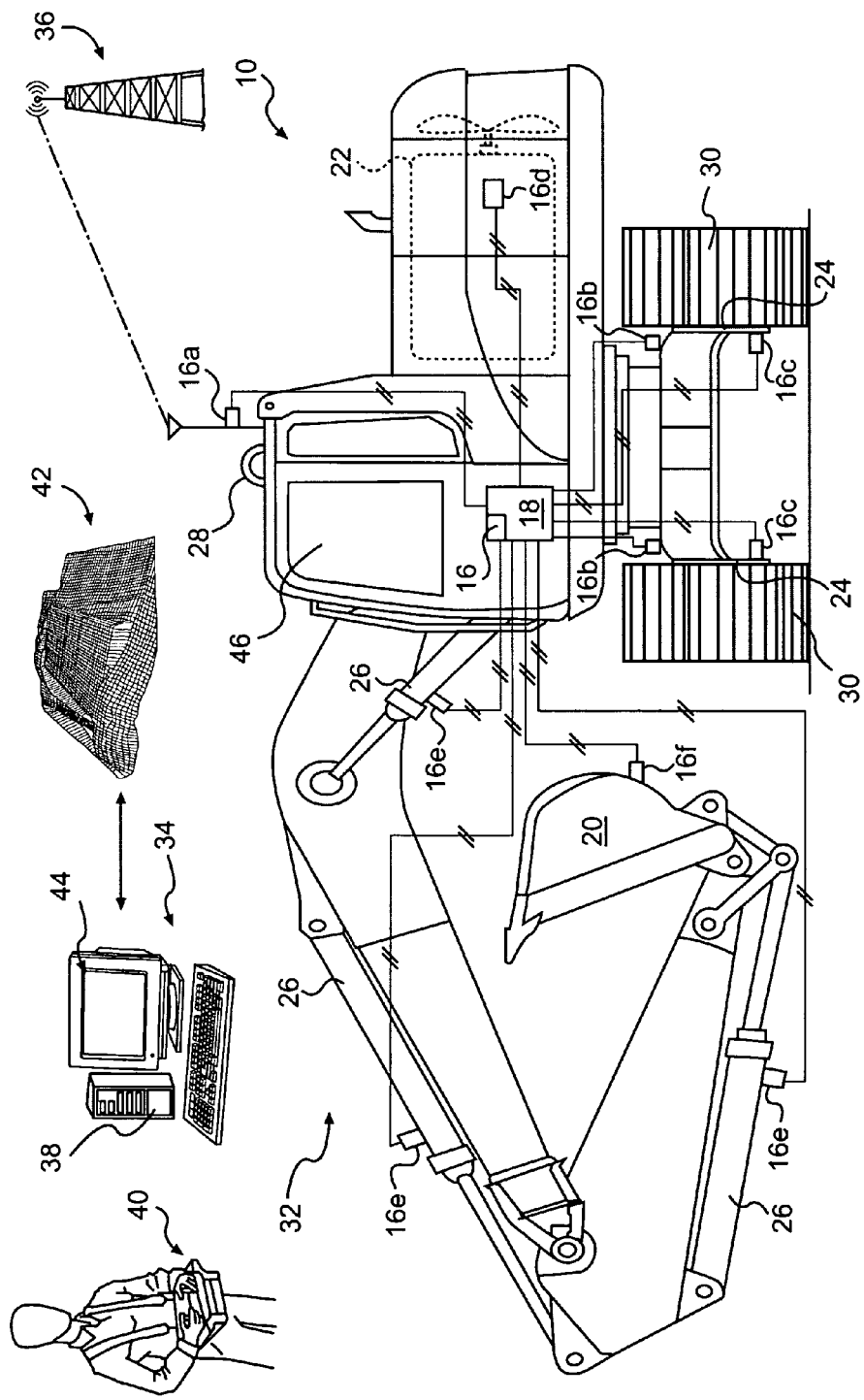
FIG. 2 is a schematic and diagrammatic illustration of an exemplary disclosed simulation and control system for use with the machine of FIG. 1.

As illustrated in FIG. 2, machine 10 may include a simulation system 14 having multiple components that interact to monitor the operation of machine 10 and perform analysis in response thereto. In particular, machine 10 may include a data module 16 in communication with a controller 18. It is contemplated that data module 16 and controller 18 may be integrated in a single unit, if desired. It is further contemplated that simulation system 14 may include additional or different components than those illustrated in FIG. 2.

Data module 16 may include a plurality of sensing devices 16a-f distributed throughout machine 10 to gather real-time data from various components and systems of machine 10. Sensing devices 16a-f may be associated with, for example, a work tool 20, a power source 22, a transmission device 24, one or more actuator devices 26, a position locating device 28, driven and/or steerable traction devices 30, a torque converter (not shown), a fluid supply (not shown), operator input devices (not shown), and/or other systems and components of machine 10. These sensing devices 16a-e may automatically gather real-time data from machine 10, such as manipulation of tool 20, operation of power source 22, and/or machine travel characteristics (e.g., speed, torque, track slip rate, etc.); orientation and position of machine 10; fluid pressure, flow rate, temperature, contamination level, and/or viscosity; electric current and/or voltage levels; fluid (i.e., fuel, oil, water, etc.) consumption rates; loading levels (e.g., payload value, percent of maximum allowable payload limit, payload history, payload distribution, etc.); transmission output ratio; cycle time; idle time, grade; recently performed maintenance and/or repair operations; and other such pieces of information. Additional information may be generated or maintained by machine data module 16 such as the date, time of day, and operator information. The gathered data may be indexed relative to the time, day, date, operator, or other pieces of information, and communicated to controller 18 to trend the various operational aspects of machine 10, if desired.

For example, a first sensing device 16a may be associated with position locating device 28 to gather real-time machine position, orientation (a direction machine 10 is facing), and/or ground speed information. In one aspect, locating device 28 may include a global positioning system (GPS) comprising one or more GPS antennae disposed at one or more locations on machine 10 (e.g. on work tool 20, the front and/or rear of machine 10, etc.). The GPS antenna may receive one or more signals from one or more satellites. Based on the trajectories of the one or more signals, locating device 28 may determine a global position and orientation of machine 10 in coordinates with respect to worksite 12. Further, by repeatedly sampling machine positions, locating device 28 may determine a real-time machine ground speed based on distances between samples and time indices associated therewith, or a time between samples. Alternatively, machine position, orientation, and/or ground speed information may similarly be determined in site coordinates with respect to a ground-based location. It is to be appreciated that other positioning methods known in the art may be used alternatively or additionally.

In a further aspect, sensing device 16a may gather pitch and roll data in order to determine a real-time inclination of machine 10 with respect to the surface of worksite 12. For example, if locating device 28 includes three (or more) GPS antennae receivers disposed about machine 10 as discussed above, pitch and roll angles of machine 10 may be determined by comparing an orientation of a surface defined by the respective positions of the three (or more) receivers relative to a gravity vector and/or horizontal ground. Alternatively, sensing device 16a may be associated with conventional pitch and role inclination electronics disposed on machine 10. The electronics may include, for example, electrodes disposed within a glass vial and submerged in an electrically conductive fluid, such that as machine inclination changes, submersion depths of the electrodes also change, and electrical resistances of paths between electrodes may change accordingly. As such, the pitch and roll of machine 10 may be defined in terms of the measured resistances. It is to be appreciated that other pitch and roll and/or inclination sensors known in the art may be used alternatively or additionally.

A second sensing device 16b, for example, may be associated with traction devices 30 to gather real-time speed and/or velocity data thereof. For example, sensing device 16b may be able to determine a real-time rotational speed of traction devices 30. It is to be appreciated that a track slip rate of traction devices 30 (i.e., a rate at which traction devices 30 are spinning in place) may be indicated by a detected difference between machine ground speed, as discussed above, and traction device speed. Alternatively, track slip rate may be indicated by a sudden increase in the speed of one or more of traction devices 30 detected by sensing device 16b.

In another aspect, sensing device 16b may gather real-time steering command information. For example, in a case where traction devices 30 comprise driven, non-steerable belts or tracks, a measured difference between rotational speeds thereof may indicate a corresponding turning rate and direction negotiated by machine 10. In another aspect, wherein traction devices 30 comprise steerable wheels, or the like, sensing device 16b may simply measure a current steering angle thereof.

A third sensing device 16c, for example, may be associated with transmission device 24 to gather real-time data concerning a present transmission output (e.g., gear) utilized by machine 10. Additionally, sensing device 16c may gather real-time data concerning a torque output of transmission device 24. A fourth sensing device 16d may be associated with power source 22 in order to gather information regarding a speed output (RPM) and/or a torque output thereof.

A fifth sensing device 16e may be associated with hydraulic devices 26 to gather real-time data related to positioning of a linkage system 32 and/or tool 20. For example, actuator devices 26 may comprise hydraulic cylinders extendable throughout a range between a minimum length and a maximum length. In conjunction with known kinematics and geometry of linkage system 32 and/or tool 20, a three-dimensional position and orientation thereof, in site coordinates, may be determined based on sensed extension lengths of hydraulic devices 26.

A sixth sensing device 16f, for example, may be associated with tool 20 to gather real-time data concerning a load applied thereto. The load may be represented as a force, weight, volume, and/or mass of material engaged or supported by tool 20. Additionally, the load may be determined as a percentage of a maximum capacity load (i.e., a full load) that may be engaged or supported by tool 20. The maximum capacity load may be based on known specifications of linkage system 32, tool 20, and/or other components of machine 10. For example, if tool 20 comprises a bucket, device 16f may include a scale mechanism that may directly determine a force, weight, volume, and/or mass of the material therein. Alternatively, device 16f may comprise one or more optical sensors disposed about an inner engagement surface of tool 20 to sense a capacity to which tool 20 is filled with the material. Based on known specifications, a volume of material engaged by tool 20 may be determined. In another aspect, sensing device 16f may measure a force exerted by hydraulic devices 26 to maintain tool 20 in a desired position. As such, the measured force, in conjunction with known torque relationships between linkage system 32 and tool 20, and other specifications of machine 10, may allow determination of the force, weight, mass, volume, and/or percent capacity of the load. It is to be appreciated that other methods of load sensing known in the art may be used alternatively or additionally.

Controller 18 may be in communication with data module 16 and include any means for monitoring, recording, storing, indexing, processing, and/or communicating the real-time data concerning operational aspects of machine 10 described above. These means may include components such as, for example, a memory, one or more data storage devices, a central processing unit, or any other components that may be used to run an application. Furthermore, although aspects of the present disclosure may be described generally as being stored in memory, one skilled in the art will appreciate that these aspects may be stored on or read from different types of computer program products or computer-readable media such as computer chips and secondary storage devices, including hard disks, floppy disks, flash drives, optical media, CD-ROM, or other forms of RAM or ROM.

Controller 18 may further include a means for communicating with an offboard, remotely-located user interface 34. For example, controller 18 may include hardware and/or software that enables transmitting and receiving of the data through a direct data link (not shown) or a wireless communication link (not shown). The wireless communications may include satellite, cellular, infrared, radio, microwave, or any other type of wireless electromagnetic communications that enable controller 18 to exchange information. It is contemplated that a separate module may alternatively be included within simulation system 14 to facilitate the communication of data between controller 18 and user interface 34, if desired. In one aspect, controller 18 may communicate the data to a base station 36 equipped to relay the communications to user interface 34. Other simulation-capable machines associated with worksite 12 may also similarly communicate data to base station 36. Subsequently, the data may be communicated to an intermediary, such as a server (not show), which may appropriately package and transmit the received data to user interface 34 for simulation.

User interface 34 may represent one or more receiving, computing, and/or display systems of a business entity associated with machine 10, such as a manufacturer, dealer, retailer, owner, service provider, client, or any other entity that generates, maintains, sends, and/or receives information associated with machine 10. The one or more computing systems may embody, for example, a machine simulator, a mainframe, a work station, a laptop, a personal digital assistant, and other computing systems known in the art. Interface 34 may include components such as, for example, a memory, one or more data storage devices, a controller 38 (CPU), or any other components that may be used to run an application. In one aspect, interface 34 may include a firewall and/or require user authentication, such as a username and password, in order to prevent access thereto by unauthorized entities.

User interface 34 may be operatively coupled to communicate with a worksite terrain map 42. Terrain map 42 may include work surface data defining ground elevation, earthen material composition and/or consistency at a plurality of locations at worksite 12 defined in site coordinates. Additionally, terrain map 42 may include the location, size, shape, composition, and/or consistency of above- or below-ground obstacles at, or in the proximity of worksite 12, such as, for example, roads, utility lines, storage tanks, buildings, property boundaries, trees, bodies of water, and/or other obstacles. In one aspect, terrain map 42 may be a predetermined schematic CAD rendering or the like. In another aspect, terrain map 42 may be generated by geographic sensing equipment (not shown), such as for example, a ground-penetrating radar systems (GPR) associated with machine 10 and/or worksite 12, and/or satellite imagery equipment known in the art. It is to be appreciated that terrain map 42 may include work surface data concerning a plurality of predetermined worksites that may or may not be related to worksite 12.

Terrain map 42 may be stored within the memory, data storage devices, and/or central processing unit of controller 18 and communicated to user interface 34 in conjunction with the gathered real-time information. Alternatively, terrain map 42 may be stored within the memory, data storage devices, and/or controller 38 of user interface 34. In another aspect, terrain map 42 may be stored in a separate location and communicated to user interface 34. Further, terrain map 42 may comprise a database compatible with the real-time information gathered by data module 16. In one aspect, controller 18 may update terrain map 42 based on the received real-time data to reflect changes affected upon worksite 12 as a result of machine position during travel, and/or tool movement and loading sensed during excavation maneuvers. This feature will be discussed further in the next section to illustrate use of the disclosed simulation system 14.

User interface 34 may further include one or more monitors 44 configured to actively and responsively display a simulated environment of machine 10 on worksite 12, as well as parameters indicating machine performance and functionality, in response to the received real-time data and terrain map 42. Monitor 44 may include, for example, a liquid crystal display (LCD), a CRT, a PDA, a plasma display, a touchscreen, a portable hand-held device, or any such display device known in the art. In one aspect, monitors 44 may comprise a full 360-degree display encompassing the operator for augmented, realistic display of the simulated worksite 12.

Figure 3:
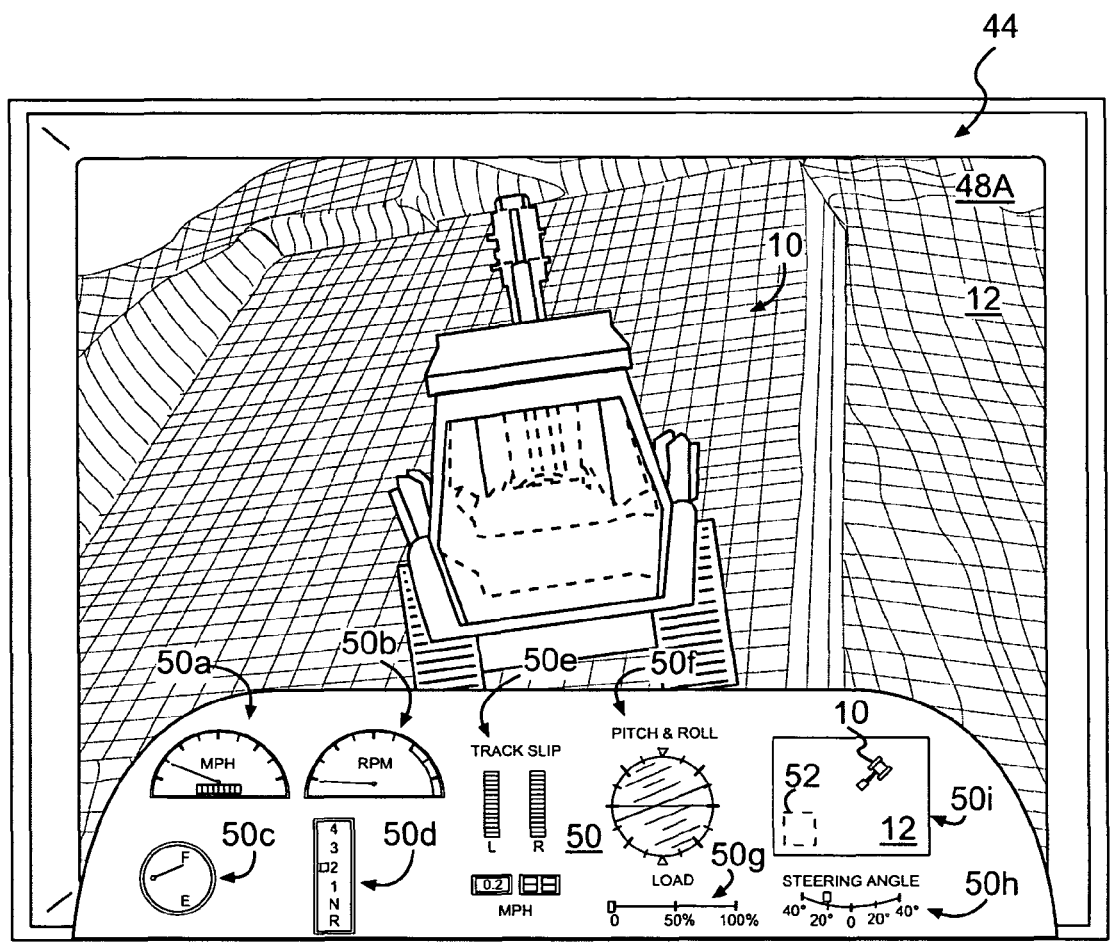
FIG. 3 is a pictorial illustration of an exemplary disclosed graphical user interface for use with the system of FIG. 2.
Figure 4:
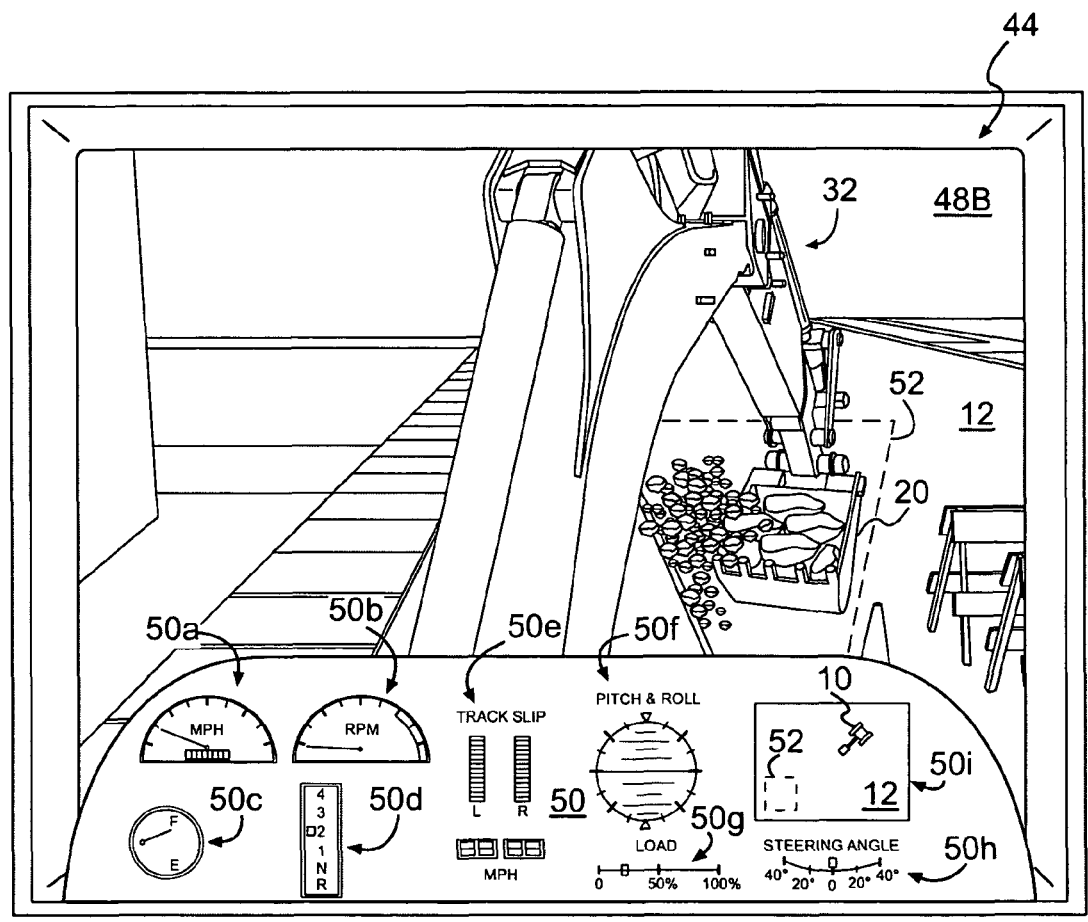
FIG. 4 is another pictorial illustration of the exemplary disclosed graphical user interface for use with the system of FIG. 2.

As illustrated in FIGS. 3 and 4, user interface 34 may generate and display one or more selectable 3-D viewpoint perspectives 48 of machine 10 and worksite 12 on monitor 44 in response to the received real-time data and based on terrain map 42 for remote control of machine 10. As such, the components of interface 34 may be tailored to render 3-D environments in conjunction with the machine control application. For example, one viewpoint 48a may correspond with a high-level, third-person view of machine 10, as it is controlled and moved about worksite 12, resembling the image of FIG. 3. From this viewpoint, an operator may discern and control, among other things, an optimal travel route and/or approach to an excavating location, work pile, or other point of interest on worksite 12.

A second viewpoint 48b may correspond with a close look at work tool movement from inside or outside of operator station 46, and may resemble the image of FIG. 4. From this viewpoint, an operator may discern and/or control, among other things, work tool and linkage system movement and loading during excavation passes, and the results of excavation from a given machine position. Additionally, details such as the contour and layout of work surface terrain proximate the machine position may be accurately depicted in second viewpoint 48b. Further, nearby obstacles included in terrain map 42, such as buildings, roads, trees, and/or property boundaries, etc., may also be accurately depicted in second view point 48b. As such, the operator may easily determine if a current terrain of worksite 12, as indicated by terrain map 42, is compatible with a desired terrain or if additional excavation passes are required, or if a desired machine maneuver may be obstructed by the surrounding obstacles and/or work surface terrain.

In a further aspect, views may be selectable from any desired reference point, since simulation may not be limited to a finite number of stationary cameras, but generated according to the terrain map 42 and the received real-time data. However, it is to be appreciated that some video may be gathered by one or more cameras mounted on machine 10 and communicated to user interface 34 in addition to the gathered real-time data. The video feed may be utilized and enhanced with simulation based on the received data and terrain map 42, and provided to the operator by way of monitor 44.

As illustrated in FIGS. 3 and 4, offboard system 34 may provide to a remote operator of machine 10 an onboard visual indication of the performance of machine 10 based on the received real-time information. For example, an information panel 50 may be included within the display area on monitor 44. Information panel 50 may include a plurality of indicators 50a-i associated with respective parameter values derived from the received real-time information.

For example, panel 50 may include a machine ground speed indicator 50a to show the present ground speed of machine (mph or km/h), an engine speed indicator 50b to show the present engine rotational speed (RPM), a fuel level indicator 50c, and/or a transmission output ratio (gear) indicator 50d. Further, panel 50 may include slip indicator 50e to identify a rate at which traction devices 30 that may be slipping. For example, slip indicator 50 may show that the left track is slipping at a rate of 0.2 mph. Panel 50 may also include a machine roll and pitch indicator 50f to provide the operator with present inclination angles of machine with respect to horizontal ground (e.g., 20-degree pitch and 12-degree roll). Additionally, panel 50 may include a loading indicator 50g to show a capacity to which tool 20 is filled (e.g., 25%), and/or a steering command indicator 50h to show a present steering angle of traction devices 30 (e.g., 22-degrees left). Panel 50 may include other indicators, such as, for example, a machine positioning indicator 50i showing a vertical overhead view of the position of machine relative to worksite 12 (e.g., a machine icon positioned on a map of worksite 12). Alternatively or additionally, machine position indicator 50i may indicate present latitude and longitude, and/or other coordinates representing a current position of machine 10 with respect to worksite 12. It is to be appreciated that any other parameter values of interest may be selectively provided in panel 50 based on the received real-time data in order to provide an augmented reality for the machine operator.

Referring back to FIG. 2, user interface 34 may include an input device 40 for remotely initiating operator command signals that control operation of machine 10 at worksite 12. The command signals may be communicated from user interface 34 to controller 18. For example, interface 34 may include a machine control application to receive the operator command signals and appropriately package them for transmission to controller 18. As such, controller 18 may generate machine command signals to control the various operational aspects of machine 10 in response to the received operator command signals. For example, controller 18 may vary electrical signals, hydraulic pressure, fluid flow rates, fluid consumption levels, etc., in order to change engine speed, ground speed, transmission output ratio, steering angle, tool 20 and/or linkage system 32 positioning in accordance with the received operator commands.

In one aspect, input device 40 may resemble the operator interface included on machine 10. For example, input device 40 may include an arrangement of joysticks, wheels, levers, pedals, switches, and/or buttons similar (or identical) to that of machine 10. As such, operator manipulation of input device 40 may have the same effect on machine 10 as corresponding manipulation of the operator interface within machine 10. Input device 40 may be generic, and used for remote control of many different types of simulation-capable machines 10. Alternatively, device 40 may be customized for a specific type of machine (e.g., a 416E Backhoe Loader, or a 365C Hydraulic Excavator, manufactured by Caterpillar Inc., etc.), and include control features unique to the machine type. However, it is to be appreciated that device 40 may simply embody one or more conventional computer interface devices, such as, for example, a keyboard, touchpad, mouse, or any other interface devices known in the art.

Operation of the disclosed simulation system 14 will be discussed further the following section.

INDUSTRIAL APPLICABILITY

The disclosed simulation system may be applicable to any machine where efficient control thereof from a remote location is desirable, and an augmented, simulated operational environment may provide certain advantages over live video feed. In particular, the disclosed simulation system may provide an augmented display based on real-time data measurements that include multiple simulated views of the machine, the worksite, and various operational parameter values, such that an operator may comfortably and effectively control the machine. Operation of simulation system 14 will now be described.

In one aspect, an operator may log into user interface 34 by entering a username and password, and initiate the remote machine control application. The operator may then be prompted to select a desired worksite. For example, controller 38 of user interface 34 may retrieve a plurality of available worksites from terrain map 42 and display them on monitor 44. The operator may then use input device 40 to navigate through and select a desired worksite 12 from among the plurality.

Subsequently, controller 38 may receive terrain information about selected worksite 12 from terrain map 42 and generate a simulated 3-D environment of worksite 12. As discussed above, the environment may include a surface of the terrain, obstacles thereon, and/or plan lines associated with the worksite 12. Controller 38 may then receive, from terrain map 42, or controllers on individual machines, position information regarding a plurality of available simulation-capable machines associated with worksite 12. As such, controller 38 may display each available machine on monitor 44, and prompt the operator to select a desired machine 10 for operation. It is to be appreciated that each operator may be authorized to access different worksites and/or machines for a variety of reasons. As such, the worksites and/or machines available to the operator may be a function of the operator's username and/or password or an operator profile associated therewith.

Once a worksite 12 and a machine 10 have been properly accessed, controller may begin receiving the streaming real-time data gathered by the particular machine 10. Additionally, controller 38 may begin receiving streaming real-time data from other simulation-capable machines associated with worksite 12. In one aspect, in order to conserve bandwidth and/or processing power, the real-time data received from other machines may be limited to certain parameters of interest, such as, for example, position and/or travel speed thereof. However, it is to be appreciated that controller 38 may receive any desired proportion of gathered real-time data from any number of simulation-capable machines associated with worksite 12. For example, controller 38 may receive real-time data concerning tool movement and/or loading of other machines for augmented simulation of the worksite environment.

Upon receiving the streaming real-time data, controller 38 may actively populate the 3-D environment with the machines 10 associated with worksite 12, and display the populated environment to the operator on monitor 44. Controller 38 may then prompt or otherwise allow the operator to initiate a command by way of input device 40 to start machine 10. Subsequently, machine 10 may be controlled and moved about worksite 12 by way of input device 40, as discussed above.

Further, controller 38 may allow the operator to select, by way of input device 40, a desired viewpoint from one or more available commonly-used viewpoints, such as, for example, one of the viewpoints 48 discussed above in connection with FIGS. 3 and 4, or a viewpoint from the perspective of work tool 20. Alternatively or additionally, controller 38 may provide a mode allowing the operator to define a viewpoint from any desired perspective by way of input device 40. For example, the operator may be able to select a first-person view of worksite 12 from the interior and/or exterior of machine, a third-person view of machine 10 and worksite 12 that follows machine 10 during navigation, and/or a view of machine 10 and/or worksite 12 from a desired fixed location. Additionally, controller 38 may allow the operator to adjust a view angle and/or zoom level associated with each of these perspectives. It is to be appreciated that the operator may change the selected viewpoint during machine operation, if desired.

In one aspect, the operator may select the high-level, third-person person perspective 48a of FIG. 3 and navigate machine 10 to a point of interest on worksite 12, such as, for example, a predetermined excavating location delineated by plan lines 52, by manipulating input device 40, as discussed above. Accordingly, the received real-time information may responsively indicate machine navigation, and controller 38 may actively update the view perspective 48a and/or information panel 50 in response thereto. In other words, as machine 10 moves about the worksite 12, the view perspective of the simulated 3-D environment provided on monitor 44 may change in accordance with the real-time measured machine ground speed, engine speed, fuel level, pitch and roll, transmission output ratio, tool position, etc.

Controller 38 may also provide certain augmented display features in order to improve operator control of machine 10. For example, if, during navigation, the received real-time data indicates that a traction device 30 is slipping, slip indicator 50e may indicate the appropriate traction device and the rate at which it is slipping (e.g., left at 0.2 mph). Additionally, if the operator is utilizing a high-level, third-person perspective 48a where the traction devices 30 are visible in the simulated environment (FIG. 4), controller 38 may indicate a slipping traction device by coloring, flashing, or otherwise visually distinguishing the traction device from the background environment. Alternatively or additionally, controller 38 may distinguish a slipping traction device simply by showing the traction device rotating or otherwise moving more quickly than the machine ground speed.

Upon reaching a point of interest on worksite 12, the operator may select a viewpoint 48b corresponding with a close look at work tool 20 from inside operator station 46 in order to facilitate excavation within plan lines 52. As the operator manipulates input device 40 in order to control work tool movement, controller 38 may actively simulate and display tool 20 and linkage system 32 movement in response to the received real-time data. For example, as the components of linkage system 32 (e.g., boom, stick, and bucket 20) are tilted downward or otherwise moved toward a work surface, sensors 16e may provide real-time position signals to module 16 for communication to user interface 34. Upon receiving the communication, controller 38 may show linkage system 32 (e.g., boom, stick and bucket 20) moving at the measured velocity to the measured position based on the real-time position signals.

Additionally, as the operator manipulates input device 40 in order to make excavation passes with work tool 20, and earthen material is removed from worksite 12, controller may actively update the simulated environment terrain shown in view perspective 48b. For example, as tool 20 engages and removes material from a given point on the work surface, sensor 16f may provide a real-time loading signal to module 18 for communication to user interface 34. Upon receiving the communication, and in conjunction with the linkage system 32 and tool 20 positioning communication discussed above, controller 38 may determine an amount of material removed from the work surface, and the location from which it was removed, upon completion of each excavation pass. As such, controller 38 may responsively update view perspective 48 and/or terrain map 42 during completion of an excavation pass to reflect geographical changes made to worksite 12. Further, if other simulation-capable machines are performing excavation on worksite 12, controller 38 may similarly update the view perspective 48b and/or terrain map 42 in response to received communications of real-time information concerning machine location, linkage system and work tool positioning, movement, and loading thereof.

Although the forgoing disclosure relates to generating a 3-D simulation of a worksite environment, it is to be appreciated that supplemental video feed may be used in conjunction therewith. For example, machine 10 may be equipped with one or more cameras, and real-time video signals may be communicated to user interface 34 in addition to the real-time gathered data. As such, controller 38 may provide a live video feed of worksite 12 to the operator by way of monitor 44, which may, in turn, be augmented with simulation based on the real-time gathered data, as discussed above. The proportion of live video to augmented simulation may be selectable by the operator and determined, in part, based on a desired simulation quality and the availability of necessary system resources, such as, for example, processing power and bandwidth. For example, for a given amount of available resources, the operator may be able to select a certain degree of live video feed (e.g., three camera views) in addition to certain simulated parameters (e.g., pitch and roll, track slip, and machine ground speed). However, it is to be appreciated that any desired proportion or combination of live video feed and/or augmented simulation may be used, within available resource limitations, as desired.

Because controller 38 may generate a 3-D environment in response to received real-time data associated with various operational parameters of machine 10, remote control of machine 10 may be facilitated without, or with minimized use of live video feed, which requires large bandwidth. In particular, the real-time data may be communicated to user interface 34 by way of radio signals or other low-bandwidth carriers, where it may be used by controller 38 to render a simulated 3-D environment of worksite 12. Moreover, since controller 38 may process the received data in order to provide different view perspectives of machine 10 with respect to worksite 12, visibility may not be limited to the number of cameras provided on the machine or respective fields of view associated therewith.

It will be apparent to those skilled in the art that various modifications and variations can be made to the method and system of the present disclosure. Other embodiments of the method and system will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:

1. A machine simulation and control system, comprising:
   a user interface configured to display a simulated environment; and
   a controller in communication with the user interface and a remotely located machine, the controller being configured to:
   receive, from the machine, real-time information related to operation of the machine at a site, the received information including at least a position of an actuator associated with a tool of the machine;
   simulate the site, operation of the machine, and movement and positioning of the machine tool based on the received information; and
   provide to the user interface the simulated site, operation, and movement and positioning of the machine tool in the simulated environment.

2. The machine simulation and control system of claim 1, wherein the simulated environment is in three dimensions.

3. The machine simulation and control system of claim 1, wherein the simulated environment includes a plurality of selectable onboard and offboard view reference locations.

4. The machine simulation and control system of claim 1, wherein the simulated environment further includes a display of at least one parameter value included in the real-time information.

5. The machine simulation and control system of claim 1, wherein the real-time information further includes a machine position parameter, and the controller is further configured to indicate in the simulated environment a position of the machine on the site based on the machine position parameter.

6. The machine simulation and control system of claim 5, wherein the real-time information further includes at least one of a travel speed of the machine, a steering command of the machine, or a load parameter indicating a load on the tool, and the controller is further configured to indicate in the simulated environment at least one of the travel speed of the machine, the steering command, or the load on the tool, respectively, based on the real-time information.

7. The machine simulation and control system of claim 1, wherein the real-time information further includes roll and pitch parameters, and the controller is further configured to indicate in the simulated environment a roll and pitch of the machine based on the roll and pitch parameters.

8. The machine simulation and control system of claim 1, wherein the real-time information further includes at least one of a slip parameter indicating a slip associated with a traction device of the machine, a transmission state, or an engine speed, and the controller is further configured to indicate in the simulated environment at least one of the slip, the transmission state, or the engine speed, respectively, based on the real-time information.

9. The machine simulation and control system of claim 1, wherein:
   the user interface is further configured to receive real-time machine operation instructions from a user; and
   the controller is further configured to communicate the instructions to the machine for remote control of the machine.

10. A method for remotely controlling a machine on a site from a remote location, comprising:
    monitoring machine operation, including monitoring a position of an actuator of a tool associated with the machine;
    simulating in real-time the site, machine movement within the site, machine tool position and movement within the site based on the monitored machine operation;
    providing the simulation via an operator interface at the remote location, the simulation indicating at least the machine tool position and movement;
    receiving machine control instructions via the operator interface; and
    affecting operation of the machine based on the received instructions.

11. The method of claim 10, wherein providing the simulation includes displaying at the remote location the simulated site, machine movement, and machine tool movement in three dimensions from a plurality of selectable onboard and offboard view reference locations.

12. The method of claim 10, wherein monitoring machine operation includes determining a global position of the machine, and the method further includes providing in the simulation an indication of a position of the machine on the site based on the global position of the machine.

13. The method of claim 12, wherein monitoring machine operation includes detecting an engine operating condition, and the method further includes providing in the simulation an indication of the detected engine operating condition.

14. The method of claim 12, wherein monitoring machine operation further includes monitoring at least one of a machine travel speed, a steering angle, or a load on the machine tool, and the method further includes providing in the simulation an indication of the at least one of the machine travel speed, the steering angle, or the load on the machine tool.

15. The method of claim 12, wherein simulating includes determining the position and movement of the machine tool based on the monitored position of the actuator.

16. A system for simulating machine operation at a site, comprising:
    a plurality of sensing elements for producing one or more signals indicative of real-time information related to operation of the machine and operation of a machine tool, the real-time information including positioning of an actuator associated with the machine tool;
    a machine data module located on the machine to collect and transmit the one or more signals offboard the machine;
    a user interface configured to receive operational instructions from an offboard user; and
    an offboard controller in communication with the machine data module and the user interface, the offboard controller being configured to:
    receive the one or more signals;
    simulate in real-time a three dimensional machine environment based on the one or more signals, the simulated environment including the site, the machine operation, and the machine tool operation;
provide to the user interface for display the simulated machine environment; and
transmit to the machine the operational instructions for remote control of the machine and machine tool operations.

17. The system of claim 16, wherein the simulated environment includes a plurality of selectable onboard and off-board view reference locations.

18. The system of claim 16, wherein the simulated environment further includes a display of at least one parameter value included in the one or more signals.

19. The system of claim 16, wherein the real-time information further includes at least one of a machine position parameter, a travel speed, a steering command, or a load parameter indicating a load on the machine tool, and the controller is further configured to provide in the simulated environment an indication of the at least one of a position of the machine on the site, the steering command, or the load on the machine tool, based on the real-time information.

20. A method for remotely controlling a machine on a site, comprising:
receiving, at a location remote to the machine, real-time information relating to operation of the machine on the site, the real-time information including loading of a tool associated with the machine;
providing, by simulation system controller, a simulation of the operation of the machine on the site based on the received real-time information and a terrain map associated with the site; and
in the simulation, providing an indication of the loading of the tool.

21. The method of claim 20, further comprising:
receiving machine control instructions at the location remote from the machine; and
enabling control of operation of the machine based on the received instructions.

22. The method of claim 20, wherein the received real-time information further includes at least one of an engine speed, ground speed, steering angle, transmission state, or pitch and roll of the machine, and the method further includes providing, in the simulation, an indication of the at least one of the engine speed, ground speed, steering angle, transmission state, or pitch and roll of the machine.

23. The method of claim 20, wherein the received real-time information further includes positioning information related to a positioning of an actuator of the tool, and the method further includes providing, in the simulation, an indication of a positioning of the tool based on the actuator positioning information.

24. A simulation system for controlling a machine on a site remote from the simulation system, comprising:
an operator interface for presenting a simulated environment; and
a simulation controller configured to:
receive real-time information relating to operation of the machine on the site, the real-time information including loading of a tool associated with the machine;
provide, via the operator interface, a simulation of the operation of the machine on the site based on the received real-time information and a terrain map associated with the site; and
in the simulation, provide an indication of the loading of the tool.

25. The system of claim 24, the simulation controller being further configured to:
receive, via the operator interface, machine control instructions; and
enable control of operation of the machine based on the received instructions.

26. The system of claim 24, wherein the received real-time information further includes at least one of an engine speed, ground speed, steering angle, transmission state, or pitch and roll of the machine, and the simulation controller is further configured to provide, in the simulation, an indication of the at least one of the engine speed, ground speed, steering angle, transmission state, or pitch and roll of the machine.

27. The system of claim 24, wherein the received real-time information further includes positioning information related to a positioning of an actuator of the tool, and the simulation controller is further configured to provide, in the simulation, an indication of positioning of the tool based on the actuator positioning information.

28. A method for remotely controlling a machine on a site, comprising:
receiving, at a location remote to the machine, real-time information relating to operation of the machine on the site, the real-time information including a slip parameter indicating slip of a traction device associated with the machine;
providing, by simulation system controller, a simulation of the operation of the machine on the site based at least on the received real-time information and a terrain map associated with the site; and
in the simulation, providing an indication of the slip of the traction device based on the slip parameter.

29. The method of claim 28, further comprising:
receiving machine control instructions at the location remote from the machine; and
enabling control of operation of the machine based on the received instructions.

30. The method of claim 28, wherein the received real-time information further includes at least one of an engine speed, ground speed, or transmission state of the machine, and the method further includes providing, in the simulation, an indication of the at least one of the engine speed, ground speed, or transmission state of the machine.

31. The method of claim 28, wherein the received real-time information further includes at least one of a positioning of an actuator of a tool associated with the machine or loading information indicating loading of the tool, and the method further includes providing, in the simulation, an indication of positioning of the tool, based on the actuator positioning information, or of the loading of the tool, based on the loading information.

32. The method of claim 28, wherein the received real-time information further includes at least one of a roll and pitch of the machine or a steering command of the machine, and the method further includes providing in the simulation an indication of the at least one of the roll and pitch of the machine or the steering command of the machine.

33. A simulation system for controlling a machine on a site remote from the simulation system, comprising:
an operator interface for presenting a simulated environment; and
a simulation controller configured to:
receive real-time information relating to operation of the machine on the site, the real-time information including a slip parameter indicating slip of a traction device associated with the machine;
provide, via the operator interface, a simulation of the operation of the machine on the site based at least on the received real-time information and a terrain map associated with the site; and in the simulation, provide an indication of the slip of the traction device based on the slip parameter.

34. The system of claim 33, the simulation controller being further configured to:

receive, via the operator interface, machine control instructions; and enable control of operation of the machine based on the received instructions.

35. The system of claim 33, wherein the received real-time information further includes at least one of an engine speed, ground speed, or transmission state of the machine, and the simulation controller is further configured to provide, in the simulation, an indication of the at least one of the engine speed, ground speed, or transmission state of the machine.

36. The system of claim 33, wherein the received real-time information further includes at least one of a positioning of an actuator of a tool associated with the machine or loading information indicating loading of the tool, and the simulation controller is further configured to provide, in the simulation, an indication of at least one of positioning of the tool, based on the actuator positioning information, or of the loading of the tool, based on the loading information.

37. The system of claim 33, wherein the received real-time information further includes at least one of a roll and pitch or a steering command of the machine, and the simulation controller is further configured to provide, in the simulation, an indication of the at least one of the roll and pitch or the steering command of the machine.

* * * * *